United States Patent [19]

Rodgers

[11] Patent Number: 4,694,345
[45] Date of Patent: Sep. 15, 1987

[54] VIDEO SIGNALS SPECIAL EFFECTS GENERATOR WITH VARIABLE PIXEL SIZE

[75] Inventor: Jeremy A. Rodgers, Welwyn Garden City, England

[73] Assignee: Rank Cintel Limited, Great Britain

[21] Appl. No.: 722,153

[22] Filed: Apr. 11, 1985

[51] Int. Cl.$^4$ .............................................. H04N 3/36
[52] U.S. Cl. ...................................... 358/216; 358/214
[58] Field of Search ................ 358/214, 215, 216, 209

[56] References Cited

U.S. PATENT DOCUMENTS

| 3,821,468 | 6/1974 | Busch | 178/7.1 |
| 3,824,336 | 7/1974 | Gould et al. | 178/6.8 |
| 3,935,381 | 1/1976 | Petrocelli et al. | 178/7.1 |
| 3,979,556 | 9/1976 | Vidal | 358/216 |
| 4,079,413 | 3/1978 | Yamashita | 358/83 |
| 4,096,523 | 6/1978 | Belmares-Sarabia et al. | |
| 4,272,780 | 6/1981 | Belmares-Sarabia et al. | 358/214 |
| 4,312,017 | 1/1982 | Poetsch | 358/214 |

FOREIGN PATENT DOCUMENTS 2097220A 10/1982 United Kingdom .

OTHER PUBLICATIONS

EBU Review, Aug. 1972, No. 134, pp. 156–162.
"Fernseh Color Corrector Model HC CC 407", Data Sheet H53, Dec. 1972.
"Rank Colorgrade and Autocolorgrade", Data Sheet 1975, (approx.).
Broadcast Management Engineering, Mar. 1984, pp. 75–86, (text pages only).

Primary Examiner—Gene Z. Rubinson
Assistant Examiner—Stephen Brinich
Attorney, Agent, or Firm—Ostrolenk, Faber, Gerb & Soffen

[57] ABSTRACT

A video special effects generator is simulated by using a telecine with a still film frame therein. Effects such as zoom and pan are pre-programmed in a store and used to change the telecine scanning raster to give the desired visual effect, the operation being timed relative to the video output signals. Aperture correction is also proposed to be programmed in a telecine in similar manner.

24 Claims, 5 Drawing Figures

VIDEO SIGNALS SPECIAL EFFECTS GENERATOR WITH VARIABLE PIXEL SIZE

FIELD OF THE INVENTION

This invention relates to an improved method of and apparatus for providing for special effects, such as zoom and pan, in certain video signals.

BACKGROUND OF THE INVENTION

In video signal processing it is now well-known to use a digital store capable of storing at least one picture (two fields of an interlaced signal), so that special effects can be produced by operating on the information contained in the store. As a simple example the effect of a "zoom" can be achieved by increasing the apparent size of the stored image, or a "pan" or side-by-side motion can be achieved by simulating sideways movement of the camera.

Such digital effects simulators are very expensive. They also suffer from the disadvantage, particularly on a zoom for example, that as the apparent size of the image is blown up the resolution or quality of the picture goes down. For example if the effect of a zoom down to one quarter of the original picture area is required, then the information which previously related to one pixel (picture element) now has to be spread over four pixels. In practice the situation can be much worse than this.

I have appreciated that there is one particular situation where the effects produced by a digital effects simulator can be obtained without the cost of a digital picture store and without this degradation of quality. This situation is where (a) the original image is a still image held on a slide or a single frame of cinematographic film, and (b) the video signal is produced from the image by means of a telecine.

A telecine is a known piece of equipment which is designed to produce TELEvision signals from CINEmatographic film, and is commonly used by television stations and the like to provide television signals from feature films or from news material recorded on film. Such apparatus is therefore in existence in broadcasting stations, and I have realised that a relatively-speaking inexpensive piece of additional equipment can be used to give the same effect as a digital effects simulator costing some tens of thousands of dollars.

There are basically three known types of telecine, namely flying spot, camera tube, and solid state array (usually linear array) telecines. In a flying spot telecine, the film runs between a cathode ray tube operating as a light source and a simple lightsensitive detector. The cathode ray tube is arranged to display a single spot of light which follows a raster such as to scan the film with the desired scan pattern, and the detector output thus forms the basis of a television signal. The less-common camera tube type is in a sense the converse of this, as the whole film frame is illuminated by a light source, opposed to which is a camera tube which operates with an appropriate scanning raster but otherwise like any other television camera to provide a scanned output. So far as solid state array types are concerned, only linear array types are on the market and in these the film runs between a light source and a linear semiconductor light sensor arranged across the film path on the other side of the film. Typically the sensor will have 1024 individual elements or cells. Thus one line is sensed at a time, and the array is emptied as though it were a shift register to provide a signal representing one line. Two-dimensional arrays can be foreseen in which more than one line might be available simultaneously.

Telecine systems generally preferably run with the film in continuous motion rather than in intermittent motion as in a cine projector. The movement of the film during scanning is compensated in well-known manner by appropriate distortion of the scanning raster. The telecines can be controlled by remote user controls which allow various functions to be executed, for example, slow replay, inching forward, reversing and also selecting part only of the image from the cine film, particularly where it is a wide format film such as a cinemascope film, when only a part of the image having the same aspect ratio as a television picture can be selected for transmission as a video signal.

It is known to use a pre-programming system with telecine equipment and one example of such a system is that sold by Rank Cintel Limited of Ware, Hertfordshire, England under the trade mark AMIGO. This pre-programming system is designed for use in recording a feature film on videotape for subsequent broadcasting, and is basically intended for use with flying-spot telecines. The colours on feature films, particularly older ones, are not particularly accurate, and it is therefore desirable to adjust the colour rendering to give a subjectively satisfactory appearance when viewed on a television monitor. The AMIGO pre-programming system thus allows an operator to correct the colours and indeed to store the necessary corrections so that they are applied at the required points in the running of the film. To locate the correct point it counts film frames as the film runs through the telecine. The system is also capable of interfacing with the telecine user controls so that for example with a cinemascope film the desired preprogrammed portion of the image is selected for transmission. This information is recorded in the system in relation to specific film frames by counting cine film frames from the beginning of the film.

SUMMARY OF THE INVENTION

In my invention the telecine is capable of operating without film movement, i.e. with a single frame of cine film or with a transparency (diapositive) such as a 35 mm slide taken by a conventional 35 mm camera.

An output is taken from the pre-programming system and is fed back to the telecine to control the telecine scanning raster. The pre-programming system can then be instructed to produce, say, a zoom by reducing the size of the scanning raster. Unlike a video signal digital effects simulator, this will still mean that a full complement of pixels is obtained and one pixel from the image does not have to spread itself over several pixels in the output.

The zoom or other effects can be pre-programmed by defining the initial condition (e.g. whole image displayed), the final condition (e.g. top left quarter of the image expanded to fill the screen), and the time taken for the zoom. The system then makes a linear or profiled interpolation between the two conditions to provide the zoom movement, and in my invention this movement is related to the vertical field sync-pulses of the video output signal. These syncpulses thus provide a clock input for zoom or pan operation.

To maintain good resolution during zooming, the pre-programming system also alters the aperture correction applied to the video signal so as to simulate a sharpening of the focus of the telecine.

BRIEF DESCRIPTION OF THE DRAWING

The invention will now be described in more detail with reference to the drawings in which.

DETAILED DESCRIPTION OF THE PREFERRED EMBODIMENT

Figure 1:
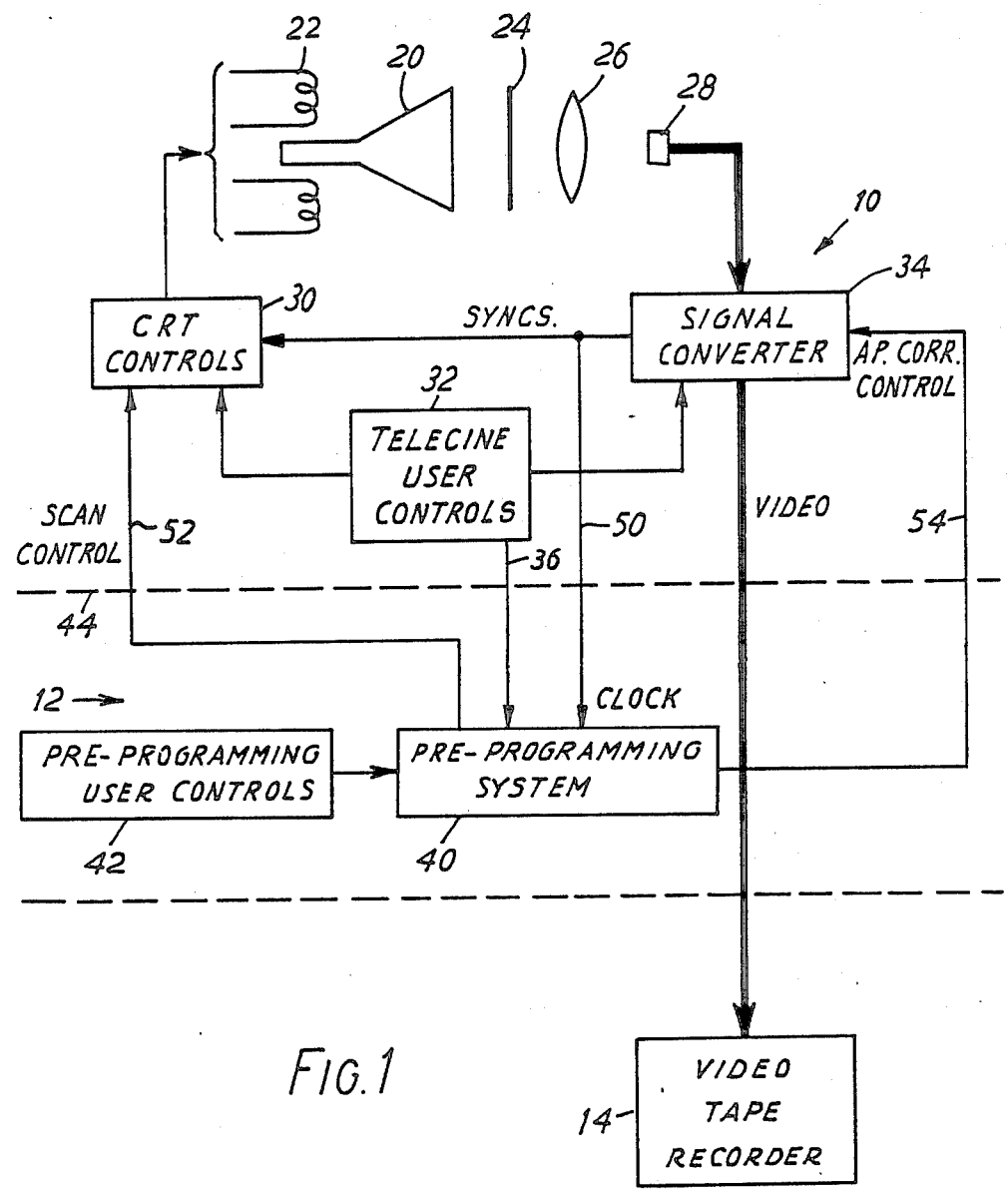
FIG. 1 is a block schematic diagram of a telecine adapted in accordance with this invention to provide special effects simulation with a still frame.

FIG. 1 is a block schematic diagram of a flying-spot telecine adapted in accordance with this invention to provide special effects similar to those available from a digital special effects generator but at much reduced cost and with improved resolution.

The apparatus illustrated broadly comprises a flying-spot telecine unit 10, a preprogramming unit 12, and a video tape recorder 14, the latter simply being illustrative of a suitable output device.

The flying spot telecine unit comprises a cathode ray tube (C.R.T.) 20 with its scanning coils 22, etc., a film position 24, a condenser lens 26, and a light-sensitive detector 28. All these are shown very diagrammatically for illustrative purposes only. The C.R.T. 20 is controlled by C.R.T. control circuitry 30 which is under the control of remote user controls 32. These controls are also coupled to signal converter circuitry 34 connected to receive the raw video output of detector 28 and to produce an N.T.S.C. encoded output signal which is passed to the video tape recorder 14. Video synchronising information is passed from the signal converter 34 to the C.R.T. control circuitry 30 to synchronise the C.R.T. scan. The signal converter circuitry 34 includes in particular circuitry for converting the sequential signal received from the detector 28 to an interlaced signal in which two interlaced fields made one video picture, and also includes aperture correction circuitry which takes the form of a transversal filter and combines information from adjacent pixels to provide a subjectively improved output signal. All this circuitry is well-known to those skilled in the art and the details thereof are therefore not necessary in this specification.

The pre-programming unit 12 is based on the above-mentioned AMIGO pre-programmer and comprises a pre-programming system 40 with asociated user controls 42. The pre-programming system 40 receives over line 36 certain "servo" control information indicating the mode of operation of the telecine, e.g. run forward, run reverse, inch forward, inch reverse and stop.

Various control signals pass across the telecine/pre-programmer interface 44. In accordance with this invention these include the following:

(a) line 50 which carries video synchronising information from the signal converter 34 to the pre-programming system 40 for use as a time clock input;

(b) line 52 which carries scan control information from the pre-programming system 40 to the C.R.T. control circuitry 30 to alter or indeed define the scanning raster provided by the scanning coils 22 on the C.R.T. 20; and (c) line 54 which carries aperture correction control signals from the pre-programming system 40 to the aperture corrector in the signal converter circuitry 34 to alter the aperture correction in dependence upon zoom.

For ease of explanation FIG. 1 is a very simplified version of the circuitry used in practice, for instance there will normally be three or more different detectors 28 for the different colour components of the signal, whereas only one is shown. It does however serve adequately to illustrate salient principles of the present invention to those skilled in the art, to whom the detailed implementation will be apparent.

In operation of the apparatus of FIG. 1 in accordance with this invention, an operator may desire to use a still image on a single frame of film and to simulate a zoom down from the full image displayed to only part of the image being displayed. To achieve this they load the pre-programming system via the user controls 42 with certain items of information as follows:

(i) the part of the image to be displayed at the beginning of the effects operation;

(ii) the part of the image to be displayed at the end of the effects operation; and (iii) the duration (in hours, minutes, seconds and video frames) of the effects operation between the beginning and end conditions, or alternatively an indication that the change is to be instantaneous.

The parts of the image referred to at (i) and (ii) can conveniently be defined in many ways, but one example is to define two diametrically-opposed corners of the desired part as percentages in relation to the full width and height of the film frame measured from the bottom left hand corner. Thus for a zoom from the full film frame down to the central quarter (in area) the initial condition is defined by co-ordinates 0,0; 100,100 and the final condition by co-ordinates 25,25; 75,75. Another way is to define the centre point of the desired part and its size, in which case the information can be encoded as 50,50; 100 and 50,50; 50 in the above example.

Then in use of the apparatus, the pre-programming system 40 operates as follows. It initially instructs the C.R.T. control circuitry over line 52 to form a raster of the size defined by the initial condition (i). It also appropriately instructs the aperture corrector in circuitry 34 over line 54 as described below. As the scan commences, the pre-programming system 40 receives synchronisation information from the signal converter 34 and in particular receives video picture of field sync. pulses. These pulses are applied over line 50 to the pre-programming system 40 as a timing input.

The pre-programming system performs a linear or profiled interpolation between the input and output conditions (i) and (ii) in dependence upon elapsed time measured in picture periods in relation to the total time of the special effect operation as defined at (iii) above. This operation is defined by the user in hours, minutes, seconds and frames and is converted by the preprogramming system to a corresponding number of picture periods. the use of the video signal sync. pulses as a timing clock in this way in the pre-programming system differs from the normal operation of the system 40 which works strictly in relation to cine film frames. However, I have appreciated that the use of such timing pulses enables the apparatus to provide effects analogous to those of a digital special effects generator with a still picture.

In parallel with control of the C.R.T. scanning raster, the pre-programming system also alters the aperture correction provided by the aperture corrector in the signal converter circuitry 34. Selection of appropriate aperture correction functions is known generally for use in video signal processing, and the aperture corrector can store a number of predetermined functions for selective use, and possibly for appropriate interpolation between them, in accordance with the signal received over line 54. The effective size of the basic pixels changes (or sharpens) as the overall image size changes, thus avoiding significant reduction of resolution as can occur with a digital special effects simulator.

While the detailed implementation of such a system as described above is believed to be within the competence of the skilled man in the art, some further details of the applicant's preferred method will now be given with reference to the remaining figures of the drawings.

Figure 2:
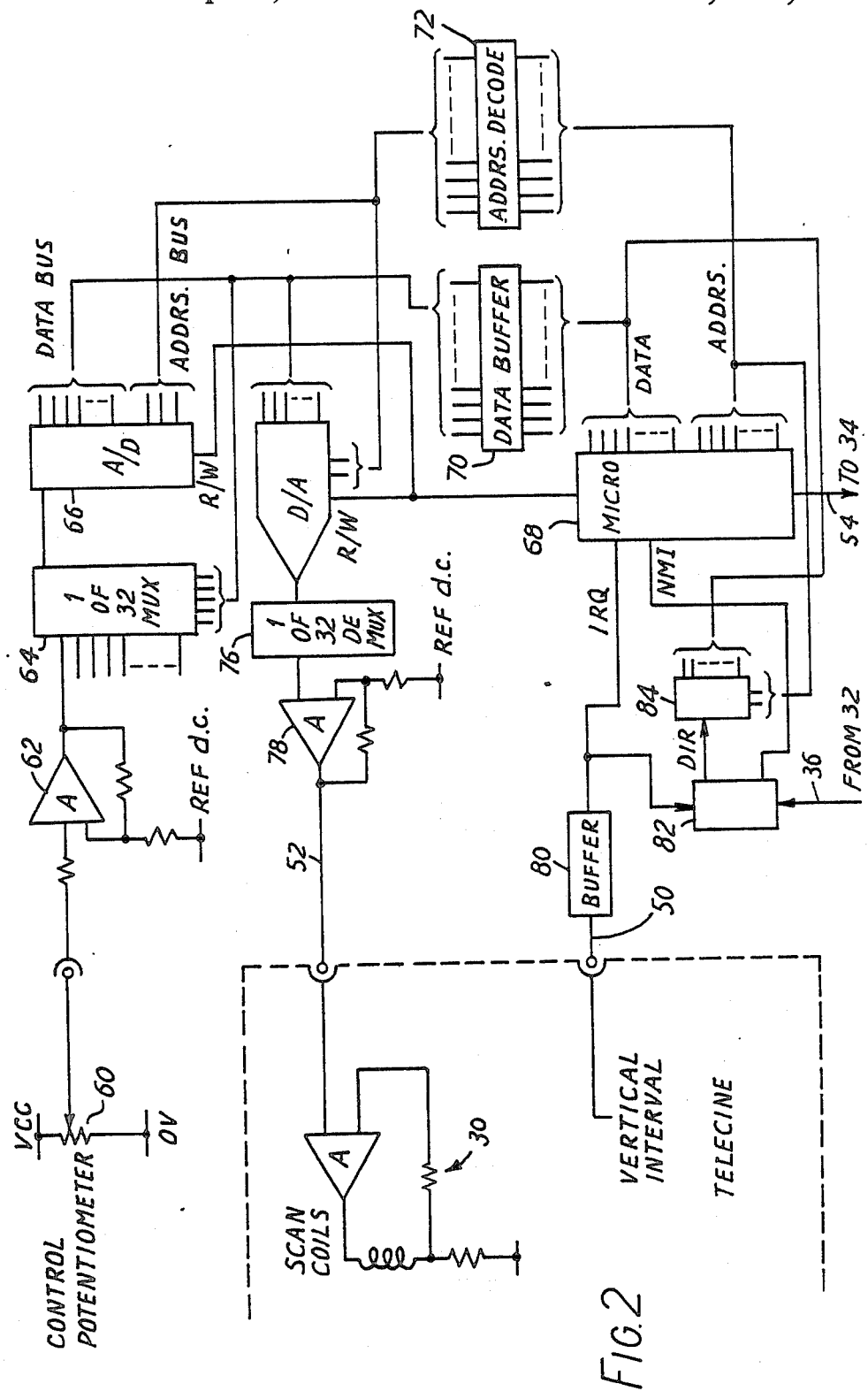
FIG. 2 is a schematic circuit diagram of one channel in the pre-programming system of the apparatus of FIG. 1.

FIG. 2 is a block schematic diagram of one analogue control signal channel in the pre-programming system 40 in FIG. 1. There are typically 32 such channels to enable different effects to be stored for selective use.

FIG. 2 shows a control potentiometer 60 coupled to an input amplifier 62 and hence to a 1 out of 32 selector 64. The output of selector 64 is converted to a digital output in an analogue to digital converter (A/D) 66 which provides data bits indicating the value represented on potentiometer 60 and address bits representing that digital channel.

A processing unit comprises a microprocessor 68 (such as a type No. MC68B09E produced by Motorola) with data buffer 70 and address decoder 72 which receive the data and address bits respectively and operates in accordance with stored programs as more fully illustrated in FIGS. 3 to 5 and described below. The microprocessor output controls a digital to analogue converter (D/A) 74 which applies through a multiplexer 76 and amplifier 78 control signals to the scanning control circuits in circuitry 30, diagrammatically shown. The microprocessor also supplies digital signals over line 54 to the aperture corrector in circuitry 34.

Timing information for the microprocessor 68 is received from the telecine. Vertical interval pulses are received in a buffer 80 which define the timing of the vertical field blanking interval in the video signal which is the time during which the pre-programming system must recalculate the scanning parameters for the next picture. Interface circuit 82 provides directional information to processor 68 via interface circuit 84 to enable an "up" count or "down" count, and is coupled to the user controls 32 in FIG. 1 by line 36.

The output of buffer 80 is applied to an interrupt request input IRQ on the microprocessor 68 and the output of buffer 82 is applied to a non-maskable interrupt NMI on the microprocessor.

The operation of the system will be described with reference to the flow charts of FIGS. 3 to 5. Referring first to FIG. 3, on initialisation 100, the programme jumps to the "hardware initialisation" sequence 102 which configures all the user controls and telecine element required to operate the pre-programmer. This completed, the programme jumps to the main control loop comprising 104, 106, 108 and 112. This programme loop scans and updates memory within the pre-programmer as well as acknowledging command calls by the user 110.

Tests are implemented as to whether or not the system (preprogrammer) is required to output stored data 112 and if so whether a "time coincidence" has occurred. That is to say that a previously stored time is equal to the count sequence currently active 114. If so, then memory workspace is refreshed with new data from the next sequence or event stored 116. This new data will have been previously entered by the user at a required count by an "Enter Data" command.

On completion of the output of new data, a test is implemented so as to determine whether the subsequent event is a "dynamic" 118. A "dynamic" is an event which signals the processor 68, FIG. 2, to compute the necessary steps required to move the telecine analogue control over the required period of time 120. Having done this the processor programme jumps to the main loop to repeat the sequences described under the disclosed conditions.

Figure 3:
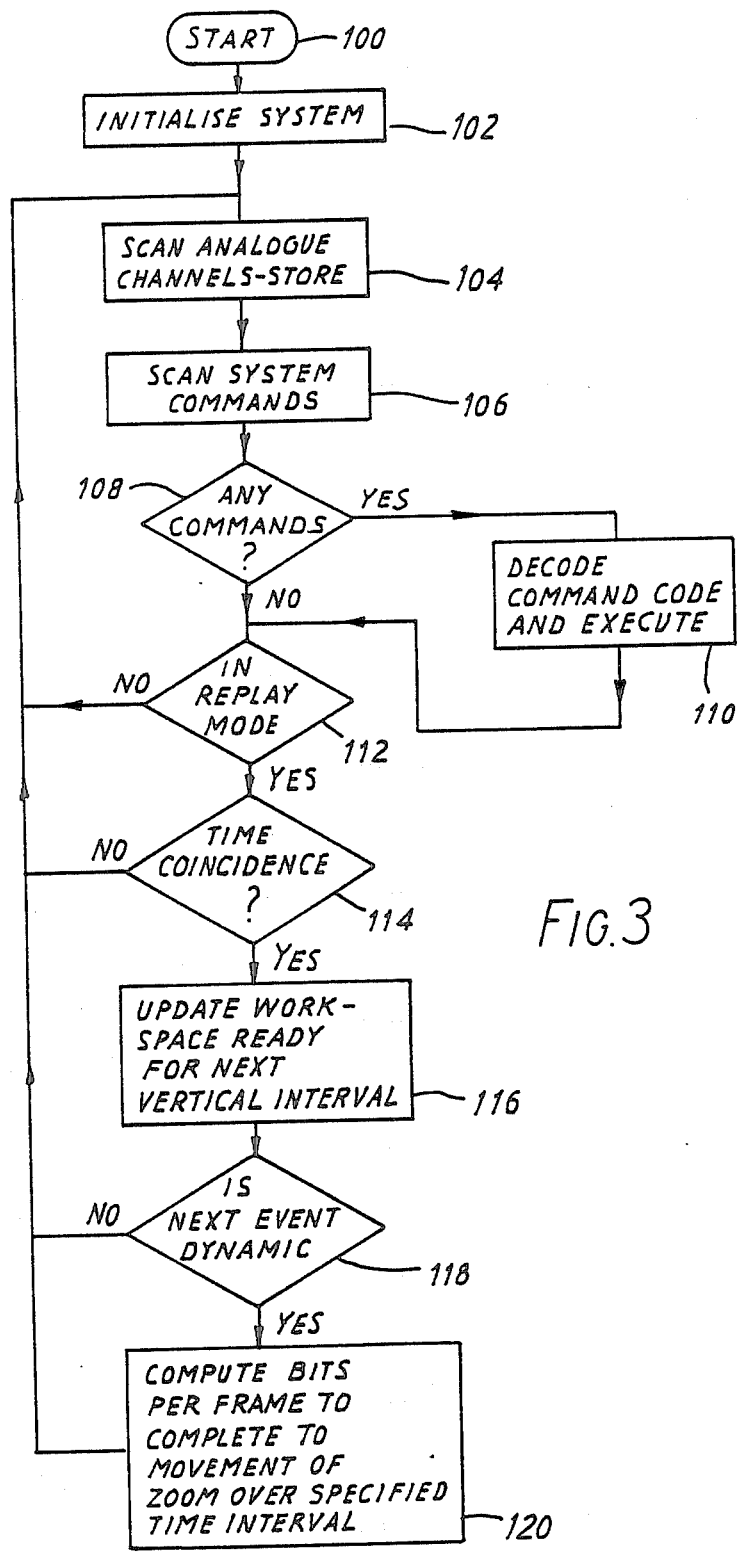
FIG. 3 is a flow chart illustrating the main operation sequence of the microprocessor in FIG. 2.
Figure 4:
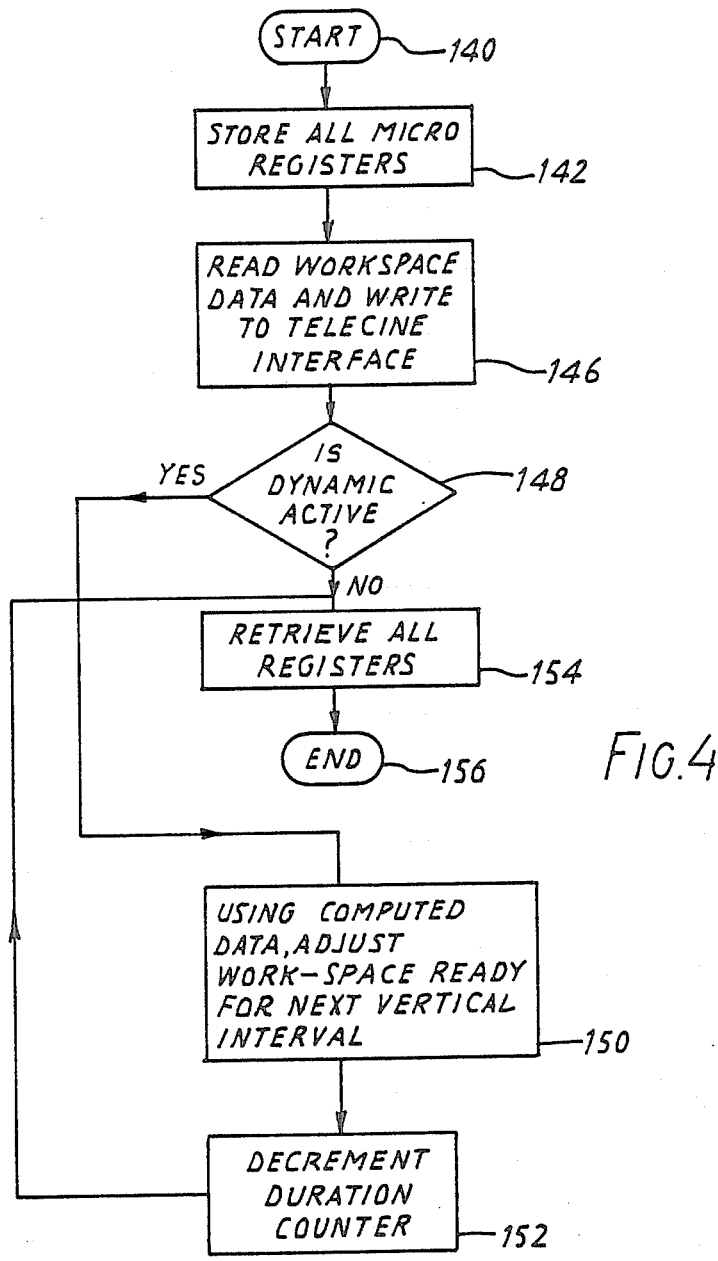
FIG. 4 is a flow chart illustrating the microprocessor operation in response to a first interrupt IRQ indicating the presence of a vertical interval in the video signal.

As shown in FIG. 4, the main loop described in FIG. 3 may be interrupted at any time by the vertical interval, IRQ, so as to cause the refresh of all telecine parameters controlled by the preprogrammer (FIG. 2, elements 80, 82 and 68). This starts at 140 and proceeds to 142 to hold all current register data. On completion, the programme jumps to the output routine when data previously placed in workspace is written to the output hardware 146. Following this, a "dynamic" check, or test, is carried out such that if a "dynamic" is active the compute steps are added or subtracted from the workspace data ready for the next vertical interval 148, 150 and 152. This done, if necessary, the processor recovers all register data and links back to the point from which it was interrupted 154 and 156.

Figure 5:
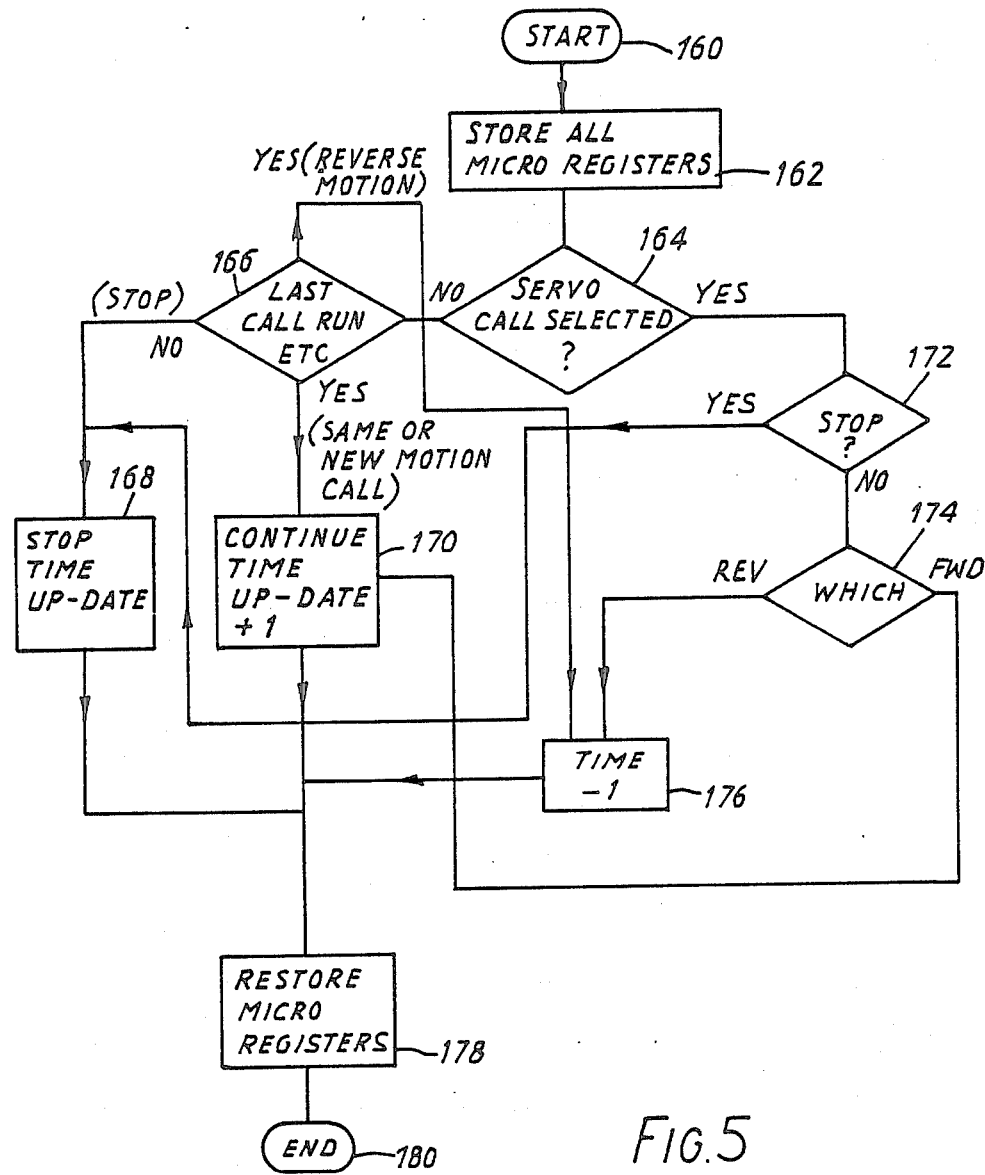
FIG. 5 is a flow chart illustrating the microprocessor operation in response to a second interrupt NMI indicating the reception of a vertical interval count pulse.

The flow-chart of FIG. 5 is the NMI (Non Maskable Interrupt) sequence which under servo control (run forward, run reverse, inch forward, inch reverse and stop) determines the direction of the count sequence as well as the rate.

On receipt of this NMI signal 160 the processor 68, FIG. 2, stores away all current register data 162 and interrogates the servo status 164. If a "stop" is or has been selected, then all count control and update is halted immediately 172 and the programme exits via 178 and 180 restoring all register data, thus returning to the point from which it was interrupted.

Step 166 determines if no servo call was made or what the last call command was. If run forward then an increment of the time code is required 170. On completion the programme exits via steps 178 and 180. Inch forward is tested by step 166 and an increment to the time code (count) is carried out every six vertical intervals. Run and inch reverse also are tested by step 166 and jump to 176 for a decrement of count data again whose exit is via 178 and 180.

It should be noted, referring to FIG. 2, that analogue data for step 104 is read using elements 62, 64, 66, 70 and 72; that output data is obtained from elements 74, 76, 70 and 72; and that the NMI control and servo controls comprise elements 80, 82, 84 and 68 on FIG. 2 and 30, 40, and 42 on FIG. 1.

The above description has been limited to a zoom operation by way of example, but other effects can be programmed for use with a still frame in the telecine.

These can include a simple "cut" from one part of the film frame to another. Alternatively the preprogrammed functions can be used to cause intentional colour distortions, such as to vary the primary colours red, green and blue as if in a "dissolve".

It will be appreciated that many modifications may be made to the example described within the scope and spirit of the claims below. In particular the invention is not limited to flying spot telecines, but can be applied to other scanning telecine devices. Features of the invention may be of quite general application to telecine control.

I claim:

1. Apparatus for producing special effects in video signals comprising a telecine and telecine programming means, wherein:
   (1) said telecine comprises:
      (a) a light source;
      (b) a light-sensitive detector;
      (c) scanning means for scanning said source of said detector with a scanning raster to provide a raw video signal;
      (d) means for locating a stationary transparent film portion containing a stationary image between said source and said detector; and
      (e) signal conversion means for receiving said raw video signal and providing an output video signal in standard format as a function of said stationary image, said output video signal including video timing signals; and
   (2) said telecine programming means comprises:
      (a) store means for storing control functions; and
      (b) raster control means for controlling said scanning raster of said telecine scanning means in response to both said stored control functions and said video timing signals.

2. Apparatus as claimed in claim 1, wherein said signal conversion means includes aperture correction means operative on said video signal, and said programming means includes means coupled to said aperture correction means to control said aperture correction means in accordance with said stored control functions.

3. Apparatus as claimed in claim 2, wherein said aperture correction controlling means controls said aperture correction means to vary the effective pixel size in dependence upon the size of the scanning raster as controlled by said raster control means.

4. Apparatus as claimed in claim 1, wherein said store means is adapted to store an initial raster condition, a final raster conditio, and a duration of change, and said raster control means interpolates between said initial and final raster conditions in accordance with elapsed time as a proportion of said duration of change.

5. Apparatus as claimed in claim 1, wherein said light source is a flying spot scanner tube and said scanning means operates on said light source.

6. Apparatus for producing special effects video signals comprising a telecine and telecine programming means, wherein:
   (1) said telecine comprises:
      (a) a light source;
      (b) a light-sensitive detector;
      (c) scanning means for scanning said source or said detector with a scanning raster to provide a raw video signal;
      (d) means for locating a stationary transparent film portion containing a stationary image between said source and said detector; and
      (e) signal conversion means for receiving said raw video signal and providing an output video signal in standard format as a function of said stationary image, said output video signal including video timing signals; and
   (2) said telecine programming means comprises:
      (a) store means for storing control functions; and
      (b) raster control means for controlling and varying said scanning raster of said telecine scanning means in response to said stored control functions, with a timing and at a rate of variation determined by said video timing signals, in such a manner that the scanning raster provided by said scanning means to scan said stationary film portion is varied to simulate special effects in accordance with said stored control functions and said video timing signals.

7. Apparatus as claimed in claim 6, wherein said signal conversion means includes aperture correction means operative on said video signal, and said programming means includes means coupled to said aperture correction means to control said aperture correction means in accordance with said stored control functions.

8. Apparatus as claimed in claim 7, wherein said aperture correction controlling means controls said aperture correction means to vary the effective pixel size in dependence upon the size of the scanning raster as controlled by said raster control means.

9. Apparatus as claimed in claim 6, wherein said store means is adapted to store an initial raster condition, a final raster condition, and a duration of change, and said raster control means interpolates between said initial and final raster conditions in accordance with elapsed time as a proportion of said duration of change.

10. Apparatus for producing special effects video signals comprising a telecine and telecine programming means, wherein:
    (1) said telecine comprises:
       (a) a light source;
       (b) a light-sensitive detector;
       (c) scanning means for scanning said source or said detector with a scanning raster to provide a raw video signal;
       (d) means for locating a stationary transparent film portion containing a stationary image between said source and said detector; and
       (e) signal conversion means for receiving said raw video signal and providing an output video signal representative of said image in standard format, said output video signal including video timing signals; and
    (2) said telecine programming means comprises:
       (a) store means for storing control functions; and
       (b) means for performing a selected one of said stored control functions on said video signal representative of said stationary image, and modifying said selected control function at a rate determined by said video timing signals, while the selected control function is being performed.

11. Apparatus as claimed in claim 10, wherein said signal conversion means includes aperture correction means operative on said video signal, and said programming means includes means coupled to said aperture correction means to control said aperture correction means in accordance with said stored control functions.

12. Apparatus comprising a telecine and telecine programming means, wherein:
    (1) said telecine comprises:

(a) a light source;
(b) a light-sensitive detector;
(c) scanning means for scanning said source or said detector with a scanning raster to provide a raw video signal;
(d) means for locating a transparent film portion containing a stationary image between said source and said detector; and
(e) signal conversion means for receiving said raw video signal and providing an output video signal in standard format as a function of said stationary image, said output video signal including video timing signals, said conversion means including aperture function means operative on said video signal; and (2) said telecine programming means comprises:
(a) store means for storing control functions;
(b) means coupled to said aperture function means in said telecine to control said aperture function means in accordance with said stored control functions in said programming means, with a timing and at a rate determined by said video timing signals.

13. A method of producing special effects video signals comprising locating a transparent film portion at a stationary position in a telecine and producing a video signal representative thereof, said video signal including video timing signals which are a function of the rate at which said transparent film portion is scanned, and altering the telecine scanning raster in accordance with pre-programmed control functions and at a timing and a rate of alteration determined by said video timing to scan different portions of said film portion and simulate desired special effects.

14. A method as claimed in claim 13, wherein said telecine scanning raster is altered by interpolating between a defined initial raster condition and a defined final raster condition in accordance with elapsed time as a proportion of a defined duration of change.

15. A method as claimed in claim 13, wherein the telecine comprises an aperture corrector, and including altering the aperture correction function provided by the aperture corrector in response to said pre-programmed control functions.

16. A method of operating a telecine, said telecine comprising an aperture corrector in the video output channel, the method comprising pre-programming desired aperture correction functions for the aperture corrector, scanning a film portion containing a stationary image in the telecine, applying the resultant signal to the video input of the aperture corrector, and applying to a control input of the aperture corrector a control signal indicative of the desired aperture correction function determined by the pre-programmed aperture correction functions, said pre-programmed aperture control functions being selected in response to video signal synchronizing timing information generated as a function of the frequency at which said film portion is scanned.

17. Apparatus for producing special effects in video signals comprising a telecine and telecine programming means, wherein:
(1) said telecine comprises:
(a) a light source;
(b) a light-sensitive detector;
(c) scanning means for scanning said source or said detector with a scanning raster to provide a raw video signal;
(d) means for locating a stationary transparent film portion between said source and said detector; and
(e) signal conversion means for receiving said raw video signal and providing an output video signal in standard format, said signal conversion means including aperture correction means operative on said video signal; and (2) said telecine programming means comprises:
(a) store means for storing control functions;
(b) raster control means for controlling said telecine scanning means in response to said stored control functions;
(c) means for receiving video timing signals from said telecine to provide a time clock for said stored control functions; and
(d) means coupled to said aperture correction means to control said aperture correction means in accordance with said stored control functions.

18. Apparatus as claimed in claim 17, wherein said aperture correction controlling means controls said aperture correction means to vary the effect pixel size in dependence upon the size of the scanning raster as controlled by said raster control means.

19. Apparatus for producing special effects in video signals comprising a telecine and telecine programming means, wherein:
(1) said telecine comprises:
(a) a light source;
(b) a light-sensitive detector;
(c) scanning means for scanning said source or said detector with a scanning raster to provide a raw video signal;
(d) means for locating a stationary transparent film portion between said source and said detector; and
(e) signal conversion means for receiving said raw video signal and providing an output video signal in standard format; and (2) said telecine programming means comprises:
(a) store means for storing control functions, said store means being adapted to store an initial raster scan condition, a final raster scan condition, and a duration of change;
(b) raster control means for controlling said telecine scanning means in response to said stored control functions, said raster control means interpolating between said initial and final raster conditions in accordance with the lapsed time as a proportion of said duration of change.

20. Apparatus for producing special effects in video signals comprising a telecine and telecine programming means, wherein:
(1) said telecine comprises:
(a) a light source;
(b) a light-sensitive detector;
(c) scanning means for scanning said source or said detector with a scanning raster to provide a raw video signal;
(d) means for locating a stationary transparent film portion between said source and said detector; and
(e) signal conversion means for receiving said raw video signal and providing an output video signal in standard format, said signal conversion means including aperture correction means operative on said video signal; and (2) said telecine programming means comprises:

(a) store means for storing control functions;
(b) raster control means for controlling said telecine scanning means in response to said stored control functions such that the scanning means to scan said stationary film portion can be varied to simulate special effects in accordance with said stored control functions; and
(c) means coupled to said aperture correction means to control said aperture correction means in accordance with said stored control functions.

21. Apparatus as claimed in claim 20, wherein said aperture correction controlling means controls said aperture correction means to vary the effective pixel size in dependence upon the size of the scanning rasters controlled by said raster control means.

22. Apparatus for producing special effects in video signals comprising a telecine and telecine programming means, wherein:
(1) said telecine comprises:
  (a) a light source;
  (b) a light-sensitive detector;
  (c) scanning means for scanning said source or said detector with a scanning raster to provide a raw video signal;
  (d) means for locating a stationary transparent film portion between said source and said detector; and
  (e) signal conversion means for receiving said raw video signal and providing an output video signal in standard format; and
(2) said telecine programming means comprises:
  (a) store means for storing control functions, said store means being adapted to store an initial raster condition, a final raster condition, and a duration of change; and
  (b) raster control means for controlling said telecine scanning means in response to said stored control functions, said raster control means interpolating between said initial and final raster condition in accordance with elapsed time as a proportion of said duration of change such that the scanning raster provided by said scanning means to scan said stationary film portion can be varied to simulate special effects in accordance with said stored control functions.

23. A method of producing special effects in video signals comprising locating a transparent film portion in the stationary position in a telecine and producing a video signal representative thereof, and altering the telecine scanning raster in accordance with the pre-programmed control functions to scan different portions of said film portion and thereby simulate desired special effects, said telecine scanning raster being altered by interpolating between a defined initial raster condition and a defined final raster condition in accordance with elapsed time as a proportion of a defined duration of change.

24. A method of producing special effects in video signals comprising the step of locating a transparent film portion in the stationary portion in a telecine including an aperture corrector and producing a video signal representative thereof, altering the scanning raster of the telecine in accordance with pre-programmed control function to simulate desired special effects, and altering the aperture control functions provided by the aperture corrector in response to said pre-programmed control functions.

* * * * *